US008503016B2

(12) United States Patent
Grasso et al.

(10) Patent No.: US 8,503,016 B2
(45) Date of Patent: Aug. 6, 2013

(54) SYSTEM AND METHOD FOR PROVIDING ENVIRONMENTAL FEEDBACK TO USERS OF SHARED PRINTERS

(75) Inventors: Maria Antonietta Grasso, Grenoble (FR); Victor Ciriza, La Tour du Pin (FR); Jutta Katharina Willamowski, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 521 days.

(21) Appl. No.: 12/773,165

(22) Filed: May 4, 2010

(65) Prior Publication Data

US 2011/0273739 A1    Nov. 10, 2011

(51) Int. Cl.
*G06F 3/12* (2006.01)

(52) U.S. Cl.
USPC ........ 358/1.15; 358/1.13; 358/1.14; 715/700; 715/763; 700/7.36; 700/7.37

(58) Field of Classification Search
USPC ............... 358/1.13, 1.14, 1.15; 715/700, 763; 705/7.36, 7.37
See application file for complete search history.

(56) References Cited

U.S. PATENT DOCUMENTS

| 7,567,946 B2 | 7/2009 | Andreoli et al. | |
| 2006/0132826 A1* | 6/2006 | Ciriza et al. | 358/1.15 |
| 2009/0094528 A1* | 4/2009 | Gray et al. | 715/745 |
| 2010/0259779 A1* | 10/2010 | Bellotti et al. | 358/1.15 |
| 2010/0259780 A1* | 10/2010 | Shrader et al. | 358/1.15 |
| 2011/0075191 A1 | 3/2011 | Meunier et al. | |
| 2011/0141511 A1* | 6/2011 | Milanski et al. | 358/1.15 |

FOREIGN PATENT DOCUMENTS

JP          2003248570 A  *  9/2003

OTHER PUBLICATIONS

Ipsos study for Lexmark: Lexmark Paper Waste Press Releases—"Retail Top European League of Paper Wasters" May 22, 2006, Lexmark International, Inc. http://www.lexmark.com/uncomplicate/pressrelease/home/0,7071,295522_2483_730688098_en.00.
Grasso, Antonietta, Jean-Luc Meunier (2002) Who can claim complete abstinence from peeking at print jobs? Proceedings of CSCW 2002, pp. 296-305, ACM Press.
GreenPrint: http://www.printgreener.com/earthday.html.
Conserveatree: http://conservatree.org/.
US Environmental Protection Agency http://www.epa.gov/otaq/climate/420f05004.htm#step1.
PrintAudit: http://www.printaudit.com/.
Equitrac: http://www.equitrac.com/.
Salton, G., Development in Automatic Text Retrieval, Science, 253, 974-979.
Preo Printelligence: http://www.preosoftware.com/printelligence/solution.html.
Honda Insight EcoAssist Nags Like a Backseat Hippie, Demo: http://automobiles.honda.com/insighthybrid/fuel-efficiency.aspx.
Autobloggreen, http://www.autobloggreen.com/2008/10/29/ford-smart-gauge-collects-green-leaves-for-good-behavior/.
Honda Insight EcoAssist Unifies Driver and Automobile for One Goal-Enhancing Efficiency—Demo: http://automobiles.honda.com/insight-hybrid/fuel-efficiency.aspx.
EcoButton: http://www.eco-button.com/uk/A2.1.home.htm.

* cited by examiner

*Primary Examiner* — Jacky X Zheng
(74) *Attorney, Agent, or Firm* — Fay Sharpe LLP

(57) ABSTRACT

Systems and methods are employed to quantify resource usage for review by a user. Marking engine data contains information related to a print job sent to the marking engine and community data relates to resource usage by members of a plurality of communities within a system. A resource profiling component receives the marking engine data and the community data to evaluate resource usage by a user compared to one or more of a user within their community. A visualization component receives the evaluation from the resource profiling component, generates a graphic associated with the evaluation and presents and distributes the graphic to one or more recipients.

12 Claims, 7 Drawing Sheets

SYSTEM AND METHOD FOR PROVIDING ENVIRONMENTAL FEEDBACK TO USERS OF SHARED PRINTERS

BACKGROUND

The present application is directed to the providing feedback related to user behavior. It finds particular application in collecting resource usage information, comparing it to predetermined metrics and displaying this behavioral information as it relates to environmental impact. It is to be appreciated, however, that the present exemplary embodiments are also amenable to other like applications.

To face ongoing global warming issues and in general to promote sustainable development, a number of tools have been developed that help people to assess the impact of their behavior. These tools are often referred to as carbon dioxide calculators. They collect input, either automatically or from the user, and provide a measure of how much certain behaviors affect the environment, by translating those habits into corresponding units like carbon dioxide and energy consumption levels. Such tools are becoming widespread and their overall aim is in providing awareness and ultimately changing the user's behavior to reduce the impact on the environment.

Despite their simple mechanism, these tools are very challenging to design in such a way that they provide sufficient incentive to change the user's habits and use of resources. This is because even if there is a benefit to a cleaner environment, not many are prepared to voluntarily reduce their carbon footprint by changing their habits. This phenomenon is known as a social dilemma wherein on one hand each individual is pushed to exploit the resource to his advantage as much as possible. On the other hand, if everyone behaves in an exploitative manner the resource will be damaged to the detriment of all. The dilemma is to either take the selfish short term stake or to contribute to the longer term common good.

Social pressure can be one way to influence the individual's choice. Surveys of office workers have found that social pressure can affect the use of certain printing resources (e.g., color devices) by reducing their use to only when strictly necessary. At the same time, other studies of office work show that there is an increase in use of transient documents, which can be construed as superfluous in many contexts. See e.g., *Transient Documents: Market Research and Field Study*, E. Schrader et al (2006). Transient documents can be regarded as unnecessary in many instances as they are printed not to be stored, but to support temporary current work activities. They are originated not by document processes inherently requiring paper documents, but by the need to accommodate technology failures, like readability on screen, easiness of annotation or availability of projection support in meeting rooms. Sometimes transient documents are also printed because a previous printout is not found, or because a user is unaware that a copy already exists (e.g., on a colleague's desk). Often, transient documents are printed but remain ultimately unused.

Transient documents thus present an interesting challenge, as they are not officially part of any workflow but required only to support ongoing work. Banning the possibility of printing emails for example, is generally not a feasible option as it would disrupt work. Nevertheless, this category of documents represent an aspect of the workplace that can be optimized, such as aiming for printing only what is strictly necessary and going to be used. This resource usage, however, is something left only to personal responsibility.

Several conventional devices are currently available to track personal resource usage within an office environment. One product, Green Print, tracks resource usage in view of environmental concerns. GreenPrint is installed as an application on a user's computer to assist him/her to print less through suggesting several options that in one way or another reduce the total amount of printed pages. The system also provides statistics in terms of carbon dioxide, pages and "trees" about the obtained savings. This data provides rather simple measurements related to savings, which are compared only to what is available to print in view of what is ultimately sent to a printer. There is no comparison to any other standards such as a user's historical data or other users. Accordingly, it can be unclear how the behavior can be modified (e.g., both positively and negatively) to promote further action.

Other conventional software tools, such as PrintAudit and Equitrac, are employed to reduce print-outs within an office environment to reduce printing costs for companies, which also serves to provide a favorable environmental impact. PrintAudit sells print tracking and auditing software that tracks printing activities and allows through various features, such as redirecting print jobs from high-cost to low-cost devices, forcing duplex printing, and restricts color printing and total amount of printouts per user. These standards, however, are set by policy management wherein individual workers are not enabled to adapt settings according to their preferences. Such flexibility can be important for employees working in departments that utilize disparate resources. Moreover, none of these conventional solutions focus on peer or collective comparison and behavior changes as they relate to environmental impact.

Thus, systems and methods are needed to overcome the above-referenced problems with conventional print resource tools to provide feedback related to a broader set of contextual metrics.

BRIEF DESCRIPTION

According to an aspect, a system is employed to quantify resource usage for review by a user. Marking engine data contains information related to a print job sent to the marking engine and community data relates to resource usage by members of a plurality of communities within a system. A resource profiling component receives the marking engine data and the community data to evaluate resource usage by a user compared to one or more of a user within their community. A visualization component receives the evaluation from the resource profiling component, generates a graphic associated with the evaluation and presents and distributes the graphic to one or more recipients.

According to another aspect, a system generates a graphic based upon resource usage. A content profiling component receives content data from a print job and a user profiling component receives information associated with the user that originated the print job. A social profiling component identifies the community in which the user is associated wherein a usage analysis component compares the resource usage of the user to others within the community. A visualization component distributes a graphic associated with the resource usage of the user.

According to yet another aspect, a method provides feedback to a user related to resource usage. Print job data is received from a marking engine wherein a user that sent the print job to the marking engine is identified. Content data for the print job from the print job data is also identified. The content data for the user is stored as a resource usage within a database. The resource usage is compared to other users within the community and a graphic is output that is representative of the comparison of the resource usage for the user in view of the community.

DETAILED DESCRIPTION

The embodiments herein can help users to achieve optimal use of resources in two ways. First, the systems and methods herein track print usage and identify areas where there is room for improvement. Second, the exemplary embodiments compare personal behavior with the behavior of colleagues and overall organizational goals to motivate users to improve their behavior. To promote the personal optimization of resource use, the present embodiments extend the notion of social pressure to the personal desktop environment. A shared physical environment can exert social pressure to optimize the use of common resources through the overseeing of the activities of colleagues, such as shared use of a printer. Showing how the personal use of a shared printer compares with the one of colleagues using the same printer can motivate the individual to change his/her behavior and to optimize it. It can also promote best practices within a group, if appropriate information is provided and associated to print actions of colleagues.

Figure 1:
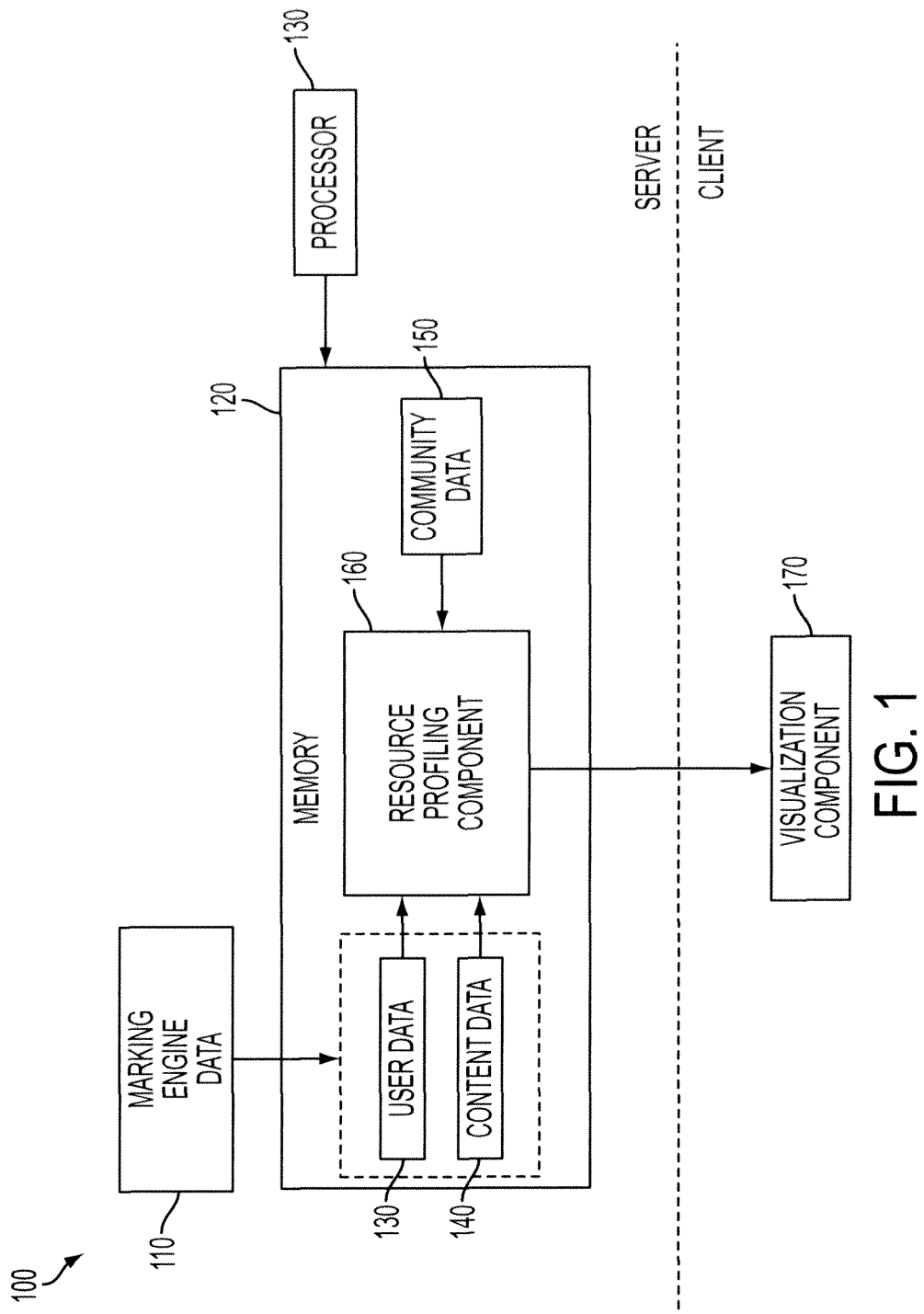
FIG. 1 illustrates a system that generates graphics based on information from a resource profiling component, in association with an exemplary embodiment.

FIG. 1 illustrates a system 100 that analyzes marking engine data 110 relative to predetermined usage metrics. This data generated from this analysis is displayed via a visualization component 170. The system 100 includes a processor 130 that executes and a memory 120 that stores computer executable instructions and/or computer readable data for performing various techniques and/or methods described herein. The memory 120 may be a computer readable recording medium on which a control program is recorded, such as a disk, hard drive, or the like. Common forms of computer-readable media include, for example, floppy disks, flexible disks, hard disks, magnetic tape or any other magnetic storage medium, CD-ROM, DVD or any other optical medium, a ROM, a PROM, an EPROM, a flash EPROM, or other memory chip or cartridge, or any other tangible medium form which a computer can read and use. Alternatively, the method may be implemented in a transmittable carrier wave in which the control program is embodied as a data signal using transmission media, such as acoustic or light waves, such as those generated during radio wave and infrared data communications, and the like.

The system 100 receives marking engine data 110, compares it to one or more metrics to determine the amount of resources utilized, and generates a visualization component 170 based on this comparison. The marking engine data 110 can be generated by a user via a marking engine such as a printer, a multi-function machine, a fax machine, or any other device that marks a substrate. In one example, a user can send information from a word processing application on a computer which is connected to a printer. The word processing application can be utilized to specify the type of content (e.g. color, black and white, etc), number of pages, the location of the printing, etc. The marking engine data 110 can be gleaned from the marking engine after each print job is sent from a computer.

The marking engine data 110 can include information related to any number of aspects of a print job. This information can be contained in substantially any standard protocol utilized for the conveyance of marking engine information. In one example, the marking engine data 110 includes the user's name, the print device, the number of pages, the type of content and the type of ink used. The marking engine data 110 is transferred to the memory component 120 where it is parsed via a user data component 130 and a content data component 140 for consumption via a resource profiling component 160.

The user data component 130 extracts user information from the marking engine data 110 that can include information relevant to the user that originated a print job sent to a marking engine. For example, user information can be extracted that includes the name of the user that sent the print job, the location of the user, or any other information specific to the identity of the originator of the print job. The content data component 140 extracts information from the marking engine data 110 related to the content of the print job. This includes the orientation of the print job, whether the printing is duplex or simplex, the type of ink specified (e.g., CMYK, black and white, etc.), whether any images are required, and/or any information related to the resources utilized by the marking engine to perform the print job.

In addition to the user data 130 and the content data 140, the resource profiling component 160 receives community data 150 that is representative of resource usage by one or more users within the same community as the user associated with the marking engine data 110. The community data 150 can be utilized by the resource profiling component 160 to compare the user's resource usage to others within the same community. In one example, a community includes peers of the user that are defined by one or more of a geographic location, a job title, a department, a job function, etc. For instance, a user within an engineering group of a corporation may restrict their printing to black and white documents (e.g., for manuals, specifications, schematics, etc.). In contrast, a user within an advertising/marketing department of a corporation can be involved in the creation and production of vivid multi-color documents for the creation of brochures that include, for example, images and/or other graphics that require a greater and more diverse ink set for their creation. Accordingly, data from the users within the same community is received by the resource profiling component 160 for comparative purposes. In one approach, the resource profiling component 160 includes a memory (not shown) to aggregate a user's resource usage over a period of time. Such usage can then be compared to others within their community over a predetermined time period.

The user data 130, the content data 140, and the community data 150 are received, aggregated and compared to one or more predetermined metrics by the resource profiling component 160. This information is then sent to a visualization component 170 to generate a graphic that is representative of such comparison. Information can be sent within a client/server architecture, wherein the resource profiling component 160 is on a server side and the visualization component 170 receives this information on a client side. It is to be appreciated that the visualization component 170 is representative of one or more such components that can be distributed throughout a network.

The graphic generated by the visualization component 170 can be indicative of how successful a user is in meeting or exceeding predetermined expectations with regard to their resource usage. A graphic can have several iteration levels that are each representative of resource usage within a continuum. For example, five iterations can be employed wherein a first iteration is representative of resource usage well below a benchmark (e.g., indicative of a low level of resource use) whereas a fifth iteration can be representative of resource usage that is well above the benchmark (e.g., indicative of a high level of resource use).

The graphic generated by the visualization component 170 can be output to a server or other distribution means within a computer network and ultimately displayed on a display utilized by the user and/or one or more other designated personnel. The generation of the graphic at these destinations can facilitate behavior modification wherein the user is cognizant of their resource usage and whether they are meeting the predetermined resource usage objectives. If, for example, the graphic is moving toward the fourth or fifth iteration of the display, the user can be aware that their usage is outside an acceptable level. In this manner, they can modify their behavior to utilize a lower amount of resources in order to stay within the predetermined benchmarks.

In one example, the user can substitute simplex for duplex printing, color for black and white printing, lower quality stock for higher quality stock, and other choices that will limit resource usage, and therefore environmental impact, caused by their behavior. In addition to the graphic, the visualization component 170 can provide suggestions to the user to help them achieve usage within or below the predetermined benchmarks. Thus, the system 100 is a closed-loop behavior modification system that allows a user to cognizant of their resource usage. Usage behavior can be modified wherein results of their modified behavior is presented to the user on an ongoing basis.

Figure 2:
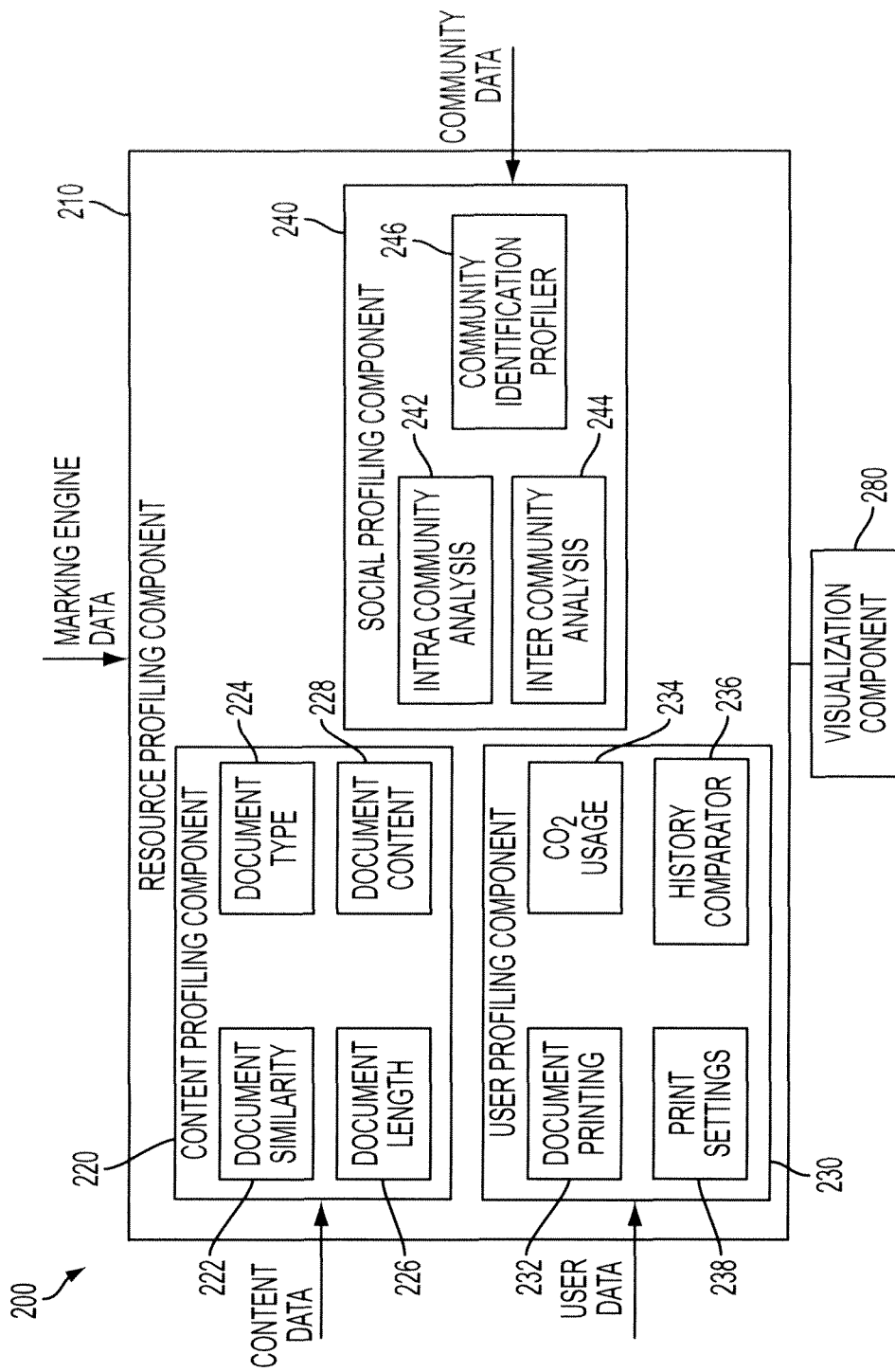
FIG. 2 illustrates a detailed view of a resource profiling component, in association with an exemplary embodiment.

FIG. 2 illustrates a system 200 utilized to receive content data, user data, and community data, perform analysis thereof as it relates to resource usage, and generate one or more graphics commensurate therewith to facilitate behavior modification of a user. A resource profiling component 210 (similar to the resource profiling component 160 of FIG. 1) includes a content profiling component 220, a user profiling component 230, and a social profiling component 240 to receive the content data, the user data, and the community data respectively. Each of these three components contains several subcomponents that are utilized to perform specific analysis with regard to disparate aspects of resource usage. This analysis is output to a usage analysis component 250, which evaluates the data and selects parameters for generation of a graphic. This information is output to a visualization component 280, which renders the graphic onto a display such as a computer monitor or similar output device.

The content profiling component 220 receives content data from an outside source. More particularly, the data can be marking engine data from a marking engine such as a printer or equivalent device. The content data can be extracted from a data stream either during pre or post data processing for a print job. The content profiling component 220 evaluates a plurality of aspects of content from a print job including a document similarity 222, a document type 224, a document length 226 and a document content 228. The document similarity 222 can evaluate the current print job content in view of previous print job content to identify any differences in each print job and/or to identify trending associated therewith. For example, the document similarity 222 can be used to identify whether a document associated with a current print job is a version of a previous one, a duplicate, or a new instance. In one example, a term frequency-inverse document frequency (TF-IDF) weight can be associated with the current print job to profile the current document and identify if the document is a new document, a previous document, or related to another document.

The document type 224 can be utilized to identify the purpose for which the document is printed, such as a type of communication including an email, a letter, etc. Other document types can be related to substantive documents such as white papers, informational essays, etc. that are unrelated to communication between two parties. In one example, a label associated with a communication between parties can be labeled as transient whereas a substantive document can be labeled as non-transient. Another instance of a transient label can occur when a document is very similar to one or more previous documents. This similarity can indicate that the previous documents are drafts and therefore transient.

Any number of document types can be defined and recognized by the content profiling component 220. Each document type can require inclusion of one or more parameters such as content, similarity to other documents, functionality, etc. Alternatively or in addition, a priority level can be associated with each document type. The priority level associated with each document type can be retrieved from a from lookup table or similar storage means and updated as needed. For example, a transient document type can have a lower priority level than a non-transient document type. The priority level can be used as one of many factors to calculate resource usage for each user. For instance, usage (e.g., printing) associated with non-transient document types can be weighted less heavily than usage associated with transient type documents. Disparity in priority can be related to the importance of using resources to generate a hardcopy of the document.

The document length 226 can include the length of content within each document. The document length 226 can be evaluated to determine if a user is following standardized trending associated with previous print jobs or if the current print job is outside of such established norms. For example, if the document length 226 deviates from an average length for a particular user, the resource usage associated with such user can be weighted more heavily than a user that consistently produces longer document lengths. Thus, documents that are longer than normal can be commensurate with greater resource usage and those that are shorter than normal can be associated with lesser resource usage. As discussed, the norm can be determined in view of a user's past usage and/or usage within the same community.

The document content 228 can include the type and format of information within a document such as text, images, decorations, graphics, and/or color within each document. Inclusion of certain types of content can cause a greater amount of resource usage. For example, documents with a high percentage of text and a relatively low percentage of images can utilize a low amount of resources to produce. In contrast, documents that include rich color content including graphics, images and/or colored text can be associated with a high resource usage. It is to be appreciated that any number of metrics and/or categories can be employed to describe the content within a document including percentage of certain content types (e.g., images).

The user profiling component 230 receives user data that can be extracted from the marking engine data as discussed above in FIG. 1. The user profiling component 230 first identifies the user associated with a print job and evaluates the activities of the user identified via a document printing component 232 a $CO_2$ usage component 234, a history comparator 236, and a print settings component 238. The document printing component 232 can identify the types of documents associated with the user including transient documents, final versions, a plurality of copies of one document, etc. Such information can associate a user with a particular baseline wherein past resource usage can be indicative of thresholds for future usage.

The $CO_2$ usage component 234 can quantify the amount of carbon dioxide associated with a user's resource usage. Each printed page can be associated with a certain level of $CO_2$. The level can be specific to the content identified via the document content component 228, in one example. For example, printing one page with five percent coverage of color text can correspond to 10 g of $CO_2$ expended for power generation, etc. Each time a print job is sent, the $CO_2$ usage component 234 can calculate the $CO_2$ used and add it to a running total usage value. In this manner, a normalized quantity can be presented to a user in an environmentally meaningful context.

The print settings component 238 can identify settings that lead to inefficient resource usage. For example, one print setting can relate to large margins that serve to increase document length unnecessarily. Other settings can be identified by the print settings component 238 that cause resource inefficiencies such as pages with little or no text, use of a cover sheet, recto-verso, and/or a simplex or a duplex output. The print settings component 238 can communicate with a lookup table or similar means to receive a list of preferred printer settings, wherein current printer settings are compared thereto. The print settings component 238 can identify any differences between the preferred and current settings wherein such differences are reported to the usage analysis component 250.

The history comparator 236 compares a user's current activity to his or her past activity as it relates to resource usage. In this manner, trends and anomalies can be identified and analyzed to evaluate ways in which certain undesirable trends can be modified for each user wherein certain desirable trends can be reinforced. In addition, the history comparator 236 can attempt to mitigate the number of anomalies in data trending that can relate to inefficient resource usage. In this manner, a user can modify their behavior to trend towards desirable data metrics and away from undesirable data metrics within a printing environment. This information is output to the usage analysis component 250.

The social profiling component 240 receives community data in order to evaluate a user's resource usage within and outside a user's community. The social profiling component 240 includes an intra-community analysis component 242, an inter-community analysis component 244, and a community identification profiler 246. The community identification profiler 246 receives the community data which includes the resource usage of users within a plurality of potentially disparate communities. For example, the community data can represent the print activities of all employees within a corporation. The community identification profiler 246 groups the users within the community data into one or more communities as appropriate. The communities can be established based on one or more predetermined benchmarks for inclusion and exclusion within or outside of a community.

Such benchmarks can include the geographic location of the user, the title of the user, the past usage habits of a user, etc. For this purpose, a lookup table or other static memory component (not shown) can be used to cross-reference users from the community data in order to identify an appropriate community for placement. Other metrics that can be utilized by the community identification profiler 246 include users within a geographic location, users of the same print engine, users of the similar number of printed documents, similar type of printed documents, etc. This information can be gleaned from a memory store that collects resource usage habits over a predetermined period of time. Once the period is ended, the community identification profiler 246 can associate each user with a category, as appropriate.

Once the community identification profiler 246 has placed each user into a community, the intra-community analysis component 242 can evaluate a user's resource usage compared to others within the same community. For example, a user within a marketing department can be compared to other users within the marketing department of the same corporation. The intra-community analysis component 242 can quantify the behavior of each user to a particular benchmark for each community. In this manner, a measure can be associated with each user to identify users that are following predetermined benchmarks and those that are outside of such benchmarks. Moreover, this analysis over time can identify users which are consistently outside of a desired benchmark and those that have reformed their behavior to follow that of others within their community.

Similarly, the inter-community analysis component 244 can evaluate behavior of users within disparate communities to determine trending or other statistical information. This data can be employed to identify best practices from one community that could be used in other communities to facilitate an overall higher level of resource usage efficiency within every community identified. This information can also identify if one or more communities are consistently inefficient relative to other communities and if users within the community have reformed their behavior over time. For example, identical departments at different locations within a corporation can be compared to insure that all users within each community follow similar efficient resource usage practices.

The usage analysis component 250 aggregates data from the content profiling component 220, the user profiling component 230 and the social profiling component 240 into a memory store 252 in order to evaluate resource usage over a predetermined segment of time. Such resource usage within the memory store 252 can be compared one or more benchmarks stored within a lookup table 254. Such benchmarks can include resource usage expected within each community and/or specific to each user within each community. This resource usage can be specific to the type of content expected, the length of documents, the types of documents printed, the print settings, the $CO_2$ usage, the frequency of printing, etc. for each user. The benchmarks within the lookup table 254 can be created by review of previous resource usage practices to increase resource usage efficiency. Further, benchmarks within the lookup table 254 can be modified over time in order to follow a "continuous improvement" paradigm until a larger resource usage goal is realized.

An evaluation component 256 compares the usage within the memory store 252 to the one or more benchmarks within the lookup table 254 to determine how well each user is performing in view of such benchmarks. This evaluation can utilize substantially any measure to determine current and/or past resource usage to the benchmarks. A graphic selector 258 receives information from the evaluation component 256 to select a graphic that is representative of each user's current and/or overall resource usage. The graphic selector 258 can utilize substantially any digitally created rendering that is displayed for consumption by each user within a system. In one example, the graphic selector 258 utilizes renderings related to environmental concerns to illustrate the relative health of foliage within the environment such as a tree or similar vegetation. It is to be appreciated that any graphic is contemplated in substantially any number of iterations to depict various levels of resource usage.

A visualization component 280 receives renderings from the graphic selector 258 and distributes such renderings to one or more output devices, such as a display. The renderings distributed can be sent at substantially any period of time such as upon request, over a predetermined period of time, on a continuous basis, etc. The visualization component 280 can identify output devices for distribution that are associated with one or more particular users. For this purpose, a network or other means of electronic communications media can be employed. In a further example, the visualization component 280 can allow a user to receive and install a widget for placement on a display such as a computer monitor. Such a widget can include settings for the display of information within the rendering on a content and/or time specific basis as desired.

Figure 3:
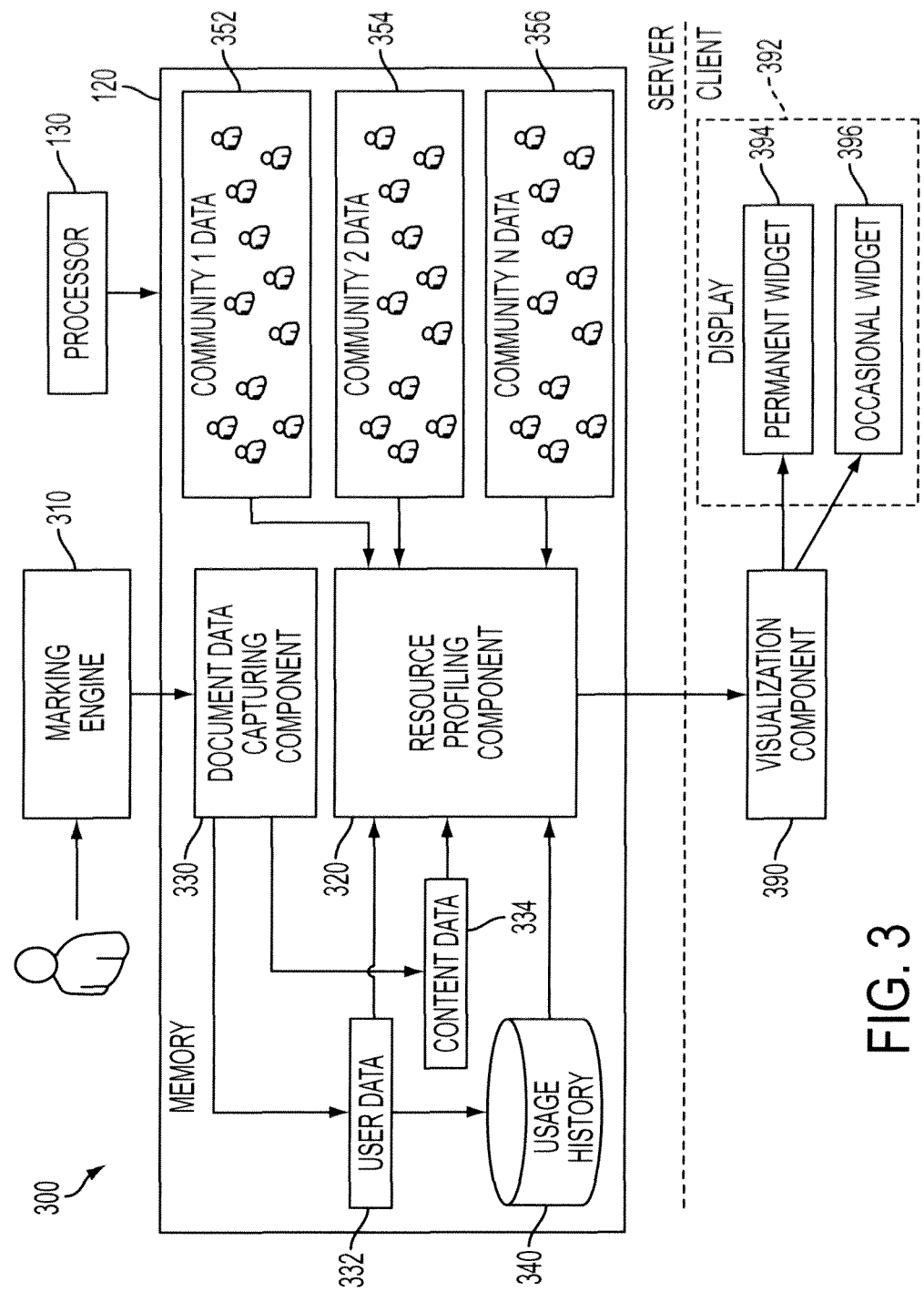
FIG. 3 illustrates a system that renders and outputs graphics via a permanent widget and an occasional widget on a display, in association with an exemplary embodiment.

FIG. 3 illustrates a system 300 utilized to analyze and provide an assessment of a user's resource usage. A marking engine 310 receives a print job generated by a user. The marking engine 310 can be substantially any device capable of placing content onto a substrate such as a printer, a multi-function machine, etc. A document data capturing component 330 captures information related to the print job from the marking engine 310 which is categorized into user data 332 and content data 334. The user data is further aggregated into a user's history component 340 to identify usage of resources by a user over a predetermined period of time. A resource profiling component 320 receives the user data 332, the content data 334 and usage history data 340.

The resource profiling component 320 evaluates this data in view of previous usage by a user (e.g., stored in the usage history component 340) and resource usage data for disparate users within any number of communities including a community 1 352, a community 2 354 up to a community N 356 wherein N is an integer greater than or equal to 3. The resource profiling component 320 evaluates the user data 332, the content data 334 and the community data 352-356 to identify resource usage associated with each user. This data is analyzed in view of other users within the same community and/or other communities and with regard to usage of the user themselves, as discussed with regard to FIG. 2 above.

Once the analysis is complete, information is output to a visualization component 390 that receives one or more renderings for distribution within the system 300. The visualization component 390 can distribute the renderings to a display 392. In this manner, a user can receive a visual representation of their resource usage that can act as a behavior modification tool to modify resource usage where appropriate. In one example, a permanent widget 394 is sent to a user to display a permanent rendering that is commensurate with a user's resource usage.

The permanent widget can provide a continuously updated graphic that can provide real time feedback to a user indicative of whether their resource usage is within or outside pre-determined benchmarks. Similarly, an occasional widget 396 can be sent to a user (e.g., upon request after ten print jobs, etc.) to provide intermittent feedback to a user regarding their resource usage. In either case, a user receives feedback related to their activities within a printing environment to allow for decision making that will facilitate a more efficient use of resources.

Figure 4:
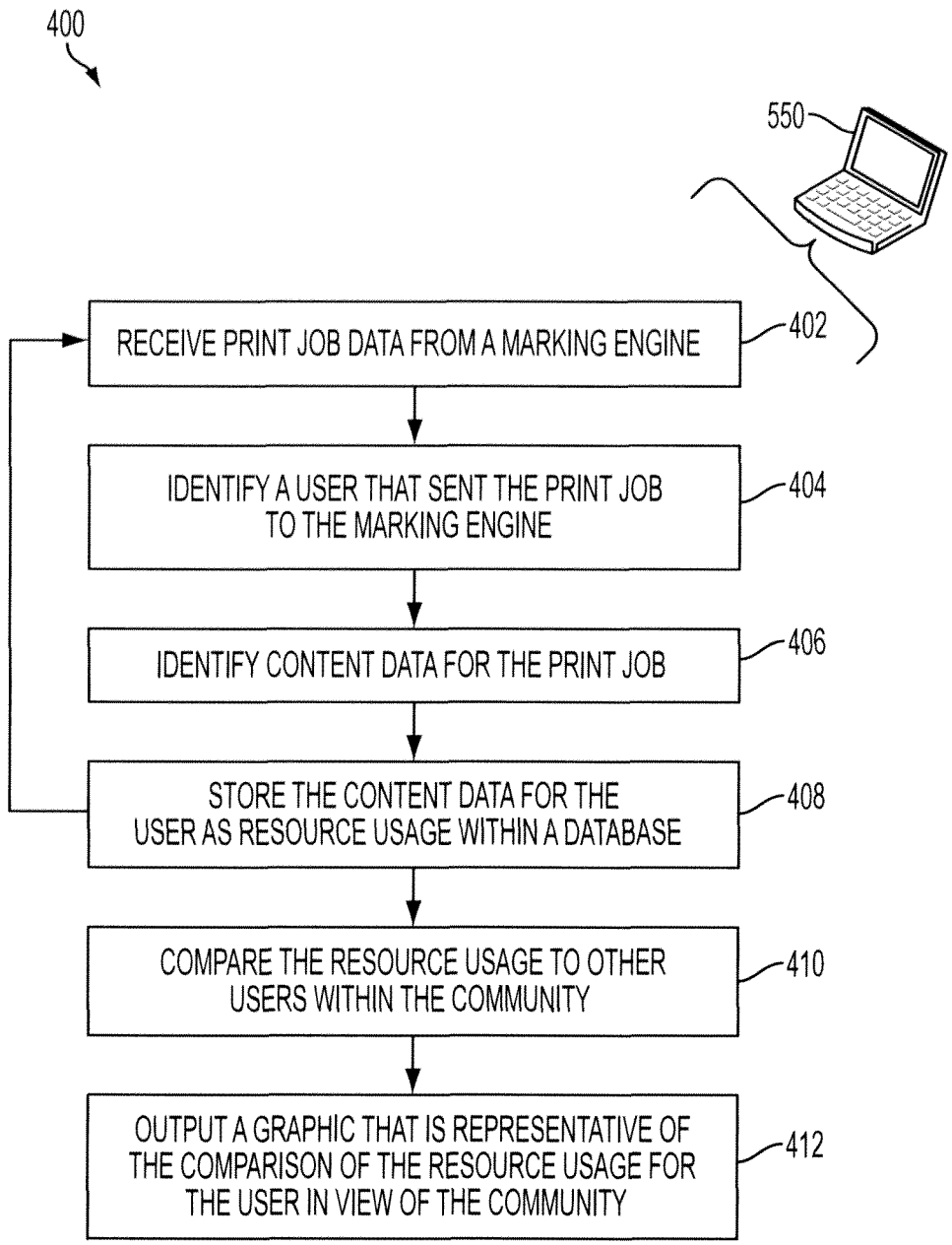
FIG. 4 illustrates a method to output a graphic representative of a user's resource usage, in association with an exemplary embodiment.

FIG. 4 illustrates a methodology 400 utilized to output a graphic representative of resource usage of a user within a community. At reference numeral 402, print job data is received from a marking engine. Such print job data can include the user that originated the print job, the type of the content within the document, and print settings associated with the marking engine. At 404, a user that sent the print job to the marking engine is identified. At 406, content data for the print job is identified. In one example, the user and content data are extracted from the print job data after a print job has been executed. Content data can include the type of content such as text versus graphics and further include the manner in which content was printed such as via color or black and white ink.

At 408, content data for the user is stored as resource usage within a database. The storage of resource usage can facilitate comparison of a user's resource usage at 410 with other users within a community. Once the content data and user data are stored with a database at 408, the method returns to step 402 to receive further print job data from the marking engine. Once the resource usage for a user is compared to others within the community at 410, a graphic is output at 412 that is representative of the comparison of the resource usage for the user in view of the community. This graphic can provide feedback to a user that he/she is within or outside a predetermined benchmark. In one example, the graphic is related to an environmental context although substantially any thematic graphics are contemplated.

Figure 5:
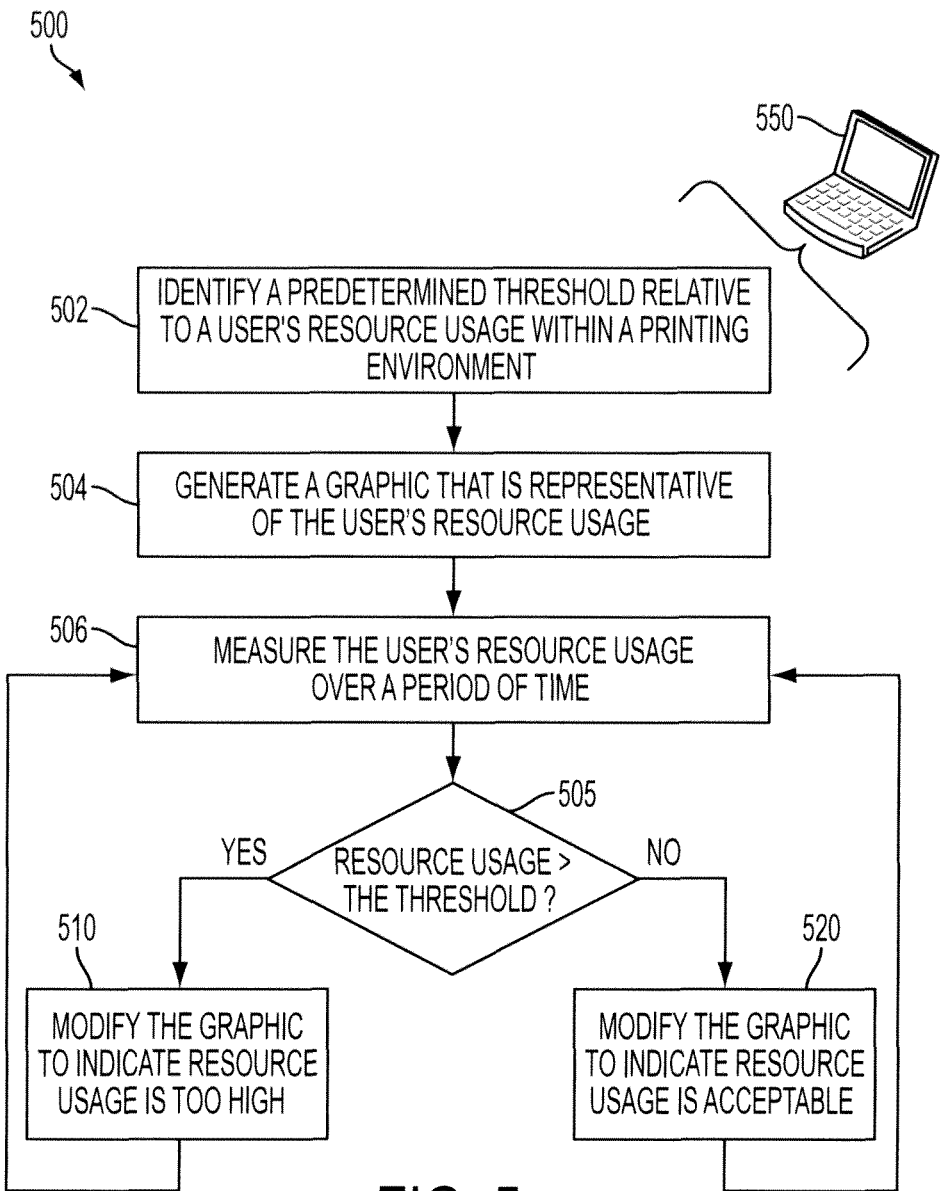
FIG. 5 illustrates a method to modify a graphic that is representative of a user's current resource usage, in association with an exemplary embodiment.

FIG. 5 illustrates a methodology 500 utilized to update a graphic that provides feedback to a user regarding their resource usage within a printing environment. At 502, a predetermined threshold is identified relative to a user's resource usage within a printing environment. This threshold can be related to substantially any print related metric such as document length, document content, document type, print settings, $CO_2$ usage, etc. At 504, a graphic is generated representative of a user's resource usage, as discussed above with regard to the method 400. At 506 the user's resource usage is measured over a period of time. If the resource usage is greater than the predetermined threshold at 505, the graphic is modified to indicate the resource usage is too high. On the other hand, if the resource usage is not greater than the predetermined threshold, at 520 the graphic is modified to indicate resource usage is acceptable. In either case, the method 500 reverts to step 506 to continuously measure the user's resource usage over a period of time wherein the graphic is modified as appropriate relative to resource usage in view of the predetermined threshold.

A computer 550 illustrates one possible hardware configuration to support the systems and methods described herein, including the methods 400 and 500 above. It is to be appreciated that although a standalone architecture is illustrated, that any suitable computing environment can be employed in accordance with the present embodiments. The computer 550 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 550 can further include a hard disk drive, a magnetic disk drive, e.g., to read from or write to a removable disk, and an optical disk drive, e.g., for reading a CD-ROM disk or to read from or write to other optical media. The computer 550 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program noninterrupt data. The operating system in the computer 550 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 550 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 550 via any wireless or hard wire protocol and/or standard.

The computer 550 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 6:
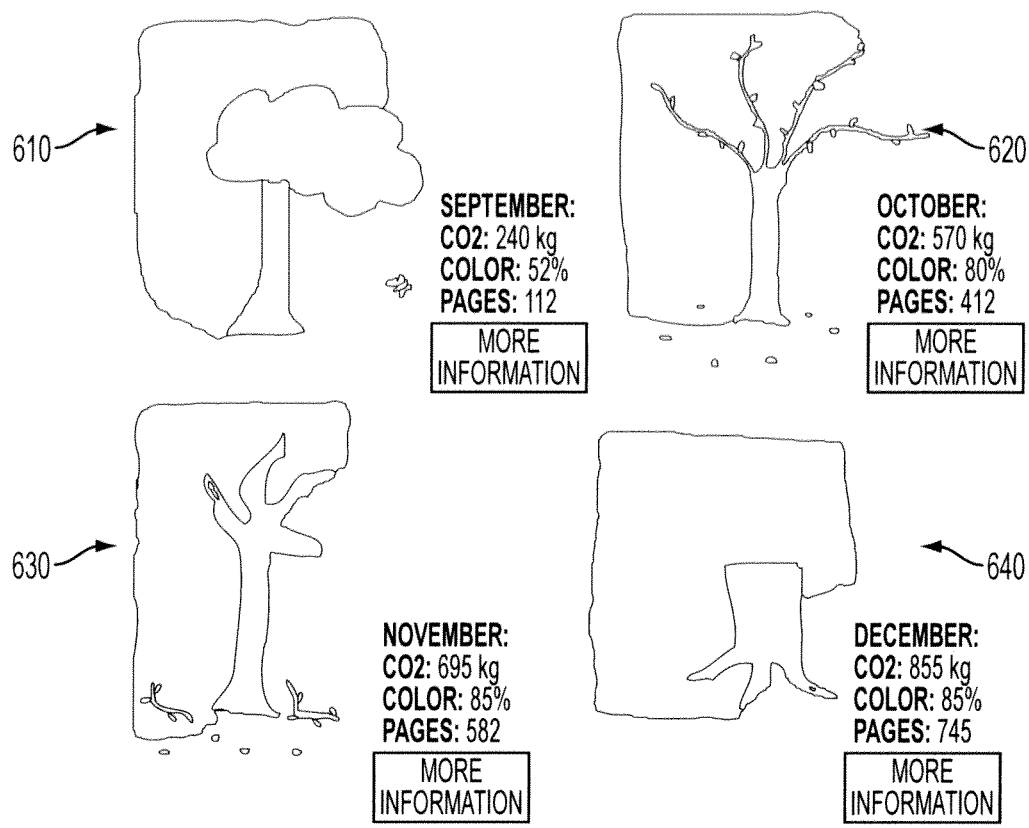
FIG. 6 illustrates a plurality of iterations of a graphic related to resource usage that can be output via a permanent widget, in association with an exemplary embodiment.

FIG. 6 illustrates an exemplary permanent widget wherein a graphic is presented in four disparate iterations, 610, 620, 630 and 640. The iteration 610 shows a tree that is healthy wherein a full population of foliage is observed. The iteration 620 shows a marked decrease in foliage and the iteration 630 shows a marked depreciation from the iteration 620. The iteration 640 shows a tree which is obviously dead and representative of continuous behavior that is outside of predetermined benchmarks. Each iteration 610-640 can further include textual information relative to resource usage such as the amount of color utilized for previous print jobs, the weight of $CO_2$ associated with the print jobs over a predefined period, the number of pages printed within the predefined period, etc.

It is to be appreciated that the iterations 610-640 are presented to a user one at a time and can change over substantially any time period to reflect a real time depiction of resource usage in view of predetermined benchmarking. That is to say, resource usage which is well within a predetermined benchmarking can cause the iteration 610 to be generated and displayed whereas a resource usage outside of such benchmarking over a predetermined period of time can cause generation of iteration 620, 630 to illustrate to the user that their resource usage is detrimental to the environment. Similarly, if the negative behavior is corrected by the user, the iteration displayed can change commensurate therewith wherein the iteration 630 can give way to the iteration 620 and eventually to the iteration 610 once an optimal resource usage behavior is realized.

By presenting iterations 610-640 via the permanent widget, a more color intensive graphic can be provided thereby diversifying content reviewed by a user from other information with which he/she are continuously confronted. As a result, the user can absorb the information presented via the widget in a more efficient way than one presented through large amounts of text. In other words, a layout that is distinguished from other content can attract a user's attention. Each iteration 610-640 can further include a more information button that allows access to information complementary to that already presented in the iterations 610-640. For example, an explanation of the $CO_2$ rating calculation can be provided such as what actions a user has done to receive a particular rating. In addition, solutions can be suggested to improve a user's rating in the future, for example, about what a user can do to reduce his/her $CO_2$ emissions, color and paper usage.

Figure 7:
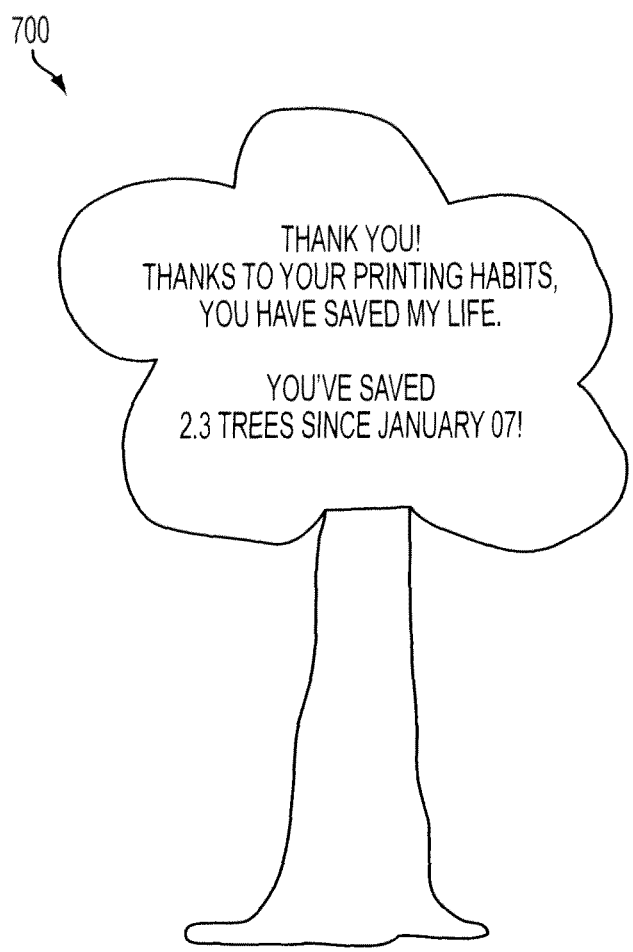
FIG. 7 illustrates a periodic graphic that provides feedback to resource usage that can be output via an occasional widget, in association with an exemplary embodiment.

FIG. 7 illustrates an exemplary occasional widget 700 that is displayed to a user. In one example, the occasional widget 700 can be output via a visualization component (e.g., 170, 280, 390). The occasional widget 700 can be displayed to a user based on substantially any condition such as, for example, a particular event (e.g., passage of a period of time), once a particular goal is reached (e.g., a quantity of savings over a predetermined period of time), etc. In this manner, a user is not inundated with a graphic on a continuous basis but can still receive feedback information to allow them to modify their behavior as it relates to resource usage in general and to particular decisions regarding print jobs in particular.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system that generates a graphic based upon resource usage, comprising:
   a content profiling component that receives content data from a print job;
   a user profiling component that receives information associated with the user that originated the print job;
   a social profiling component that identifies the community in which the user is associated;
   a usage analysis component that evaluates resource usage of the user and compares the resource usage of the user to others within the community; and,
   a visualization component that distributes a graphic associated with the resource usage of the user;
   wherein the content profiling component includes:
   a document type that identifies whether the document is one of a transient or a non-transient document, and
   a weight attributable to the document type, wherein the weight is greater for a transient document than a non-transient document, and wherein the resource usage is evaluated by the usage analysis component in accordance with the attributed weigh.

2. The system as claimed in claim 1, wherein the content profiling component identifies the similarity of the document within the print job to other documents that have been printed within a predetermined time period.

3. The system as claimed in claim 1, wherein the user profiling component includes a document printing that identifies documents printed by the user including one or more of a transient document, a final version document, a multiple copy document and a color document; wherein the usage analysis component evaluates the resource usage in accordance with the document identification.

4. The system as claimed in claim 1, further including a $CO_2$ component which measures and quantifies the amount of $CO_2$ utilized by the user over a predetermined period of time, vis-à-vis the marking engine.

5. The system as claimed in claim 4, wherein the user profiling component further includes a print settings component that evaluates the settings utilized by a user including one or more of a simplex/duplex setting, a cover sheet, color printing, and document length; wherein the usage analysis component adjusts the resource usage in accordance with the print settings component evaluation.

6. The system as claimed in claim 1, further including a history comparator which identifies trends associated with the user as a desirable trend or an undesirable trend by comparing the current print job of the user to other print jobs originated by the user over a predetermined period of time, wherein a desirable identified trend is reinforced with respect to resource usage.

7. The system as claimed in claim 1, wherein the social profiling component includes a community identification profiler that identifies a community associated with the user based on at least one of a marking engine, a job title, and a job function.

8. The system as claimed in claim 1, wherein the social profiling component further includes an intra-community analysis component that compares the resource usage of a user to others within the same community.

9. The system as claimed in claim 1, wherein the social profiling component further includes an inter-community analysis component that compares the resource usage of a user within one community to users within disparate communities.

10. The system as claimed in claim 1, wherein the usage analysis component includes an evaluation component that compares the resource usage to one or more predefined benchmarks and identifies whether the resource usage is within the predefined benchmarks.

11. The system as claimed in claim 10, further including a graphic selector that associates a graphic to the resource usage identified by the evaluation component.

12. A system that generates a graphic based upon resource usage, comprising:
   a content profiling component that receives content data from a print job;
   a user profiling component that receives information associated with the user that originated the print job;
   a social profiling component that identifies the community in which the user is associated;
   a usage analysis component that evaluates resource usage of the user and compares the resource usage of the user to others within the community; and,
   a visualization component that distributes a graphic associated with the resource usage of the user;
   wherein the content profiling component further includes a document link to identify the number of pages within the document; and
   a document content that identifies the content within the document including at least one of a text block, an image, a graphic, and an ink type, wherein the usage analysis component evaluates the resource usage in accordance with at least one of the number of pages or the identified content, each identified content corresponding to a different amount of resource usage.

* * * * *